No. 668,152. Patented Feb. 19, 1901.
R. B. BENJAMIN.
AIR BRAKE SYSTEM.
(Application filed Feb. 5, 1900.)
(No Model.) 2 Sheets—Sheet 2.
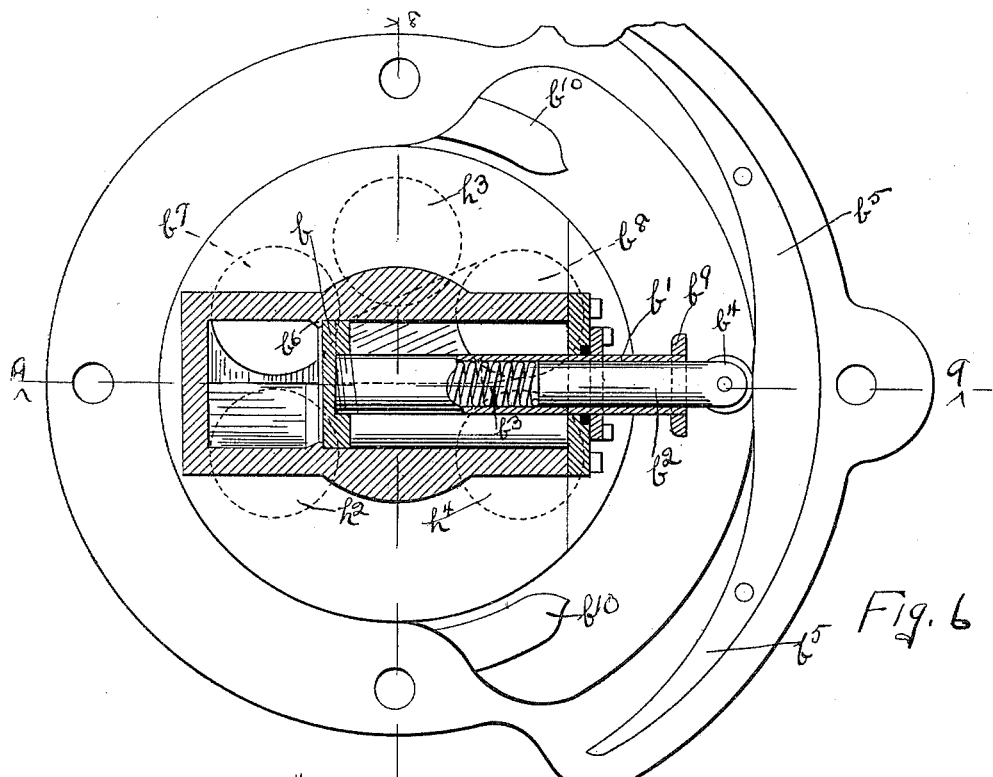
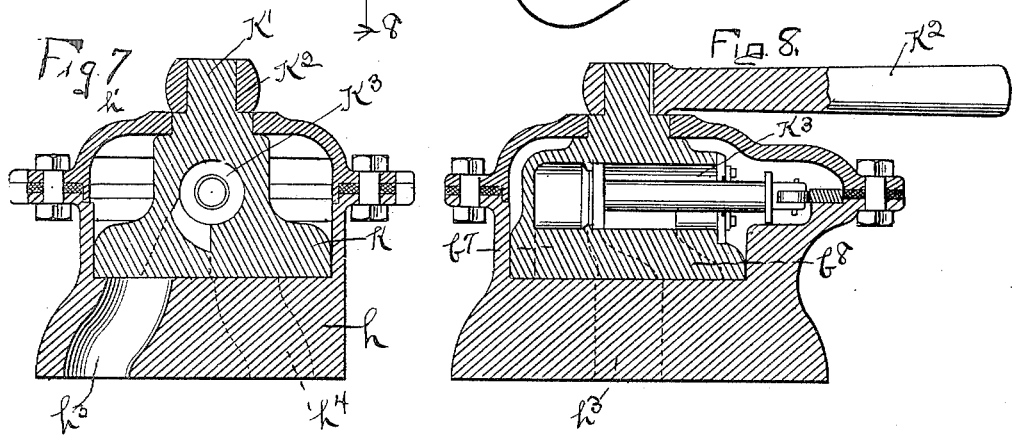

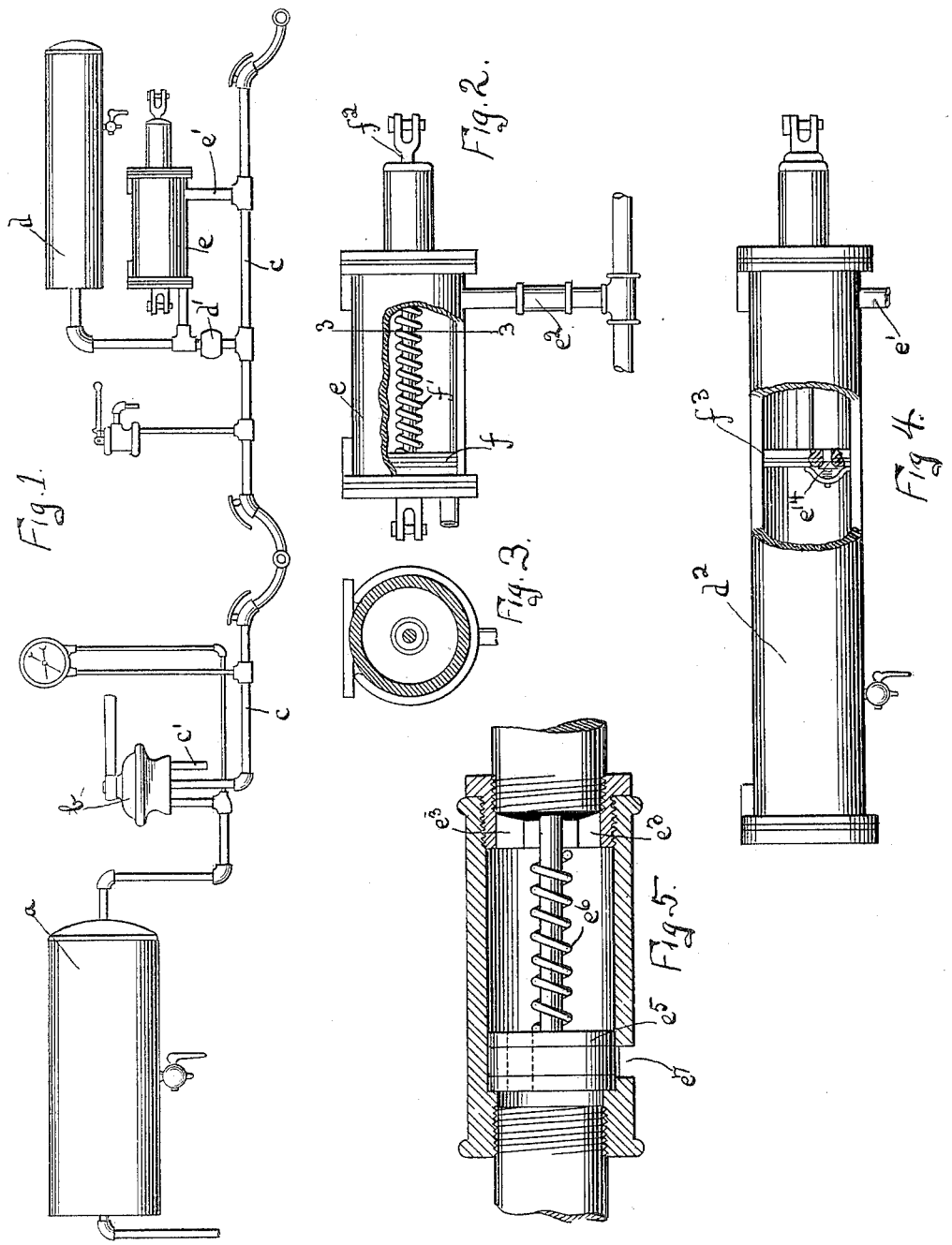

UNITED STATES PATENT OFFICE.

REUBEN B. BENJAMIN, OF CHICAGO, ILLINOIS, ASSIGNOR OF ONE-HALF TO RODNEY B. SWIFT, OF SAME PLACE.

AIR-BRAKE SYSTEM.

SPECIFICATION forming part of Letters Patent No. 668,152, dated February 19, 1901.

Application filed February 5, 1900. Serial No. 4,087. (No model.)

*To all whom it may concern:*

Be it known that I, REUBEN B. BENJAMIN, a citizen of the United States, residing at Chicago, in the county of Cook and State of Illinois, have invented a certain new and useful Improvement in Air-Brake Systems, of which the following is a full, clear, concise, and exact description, reference being had to the accompanying drawings, forming a part of this specification.

My invention relates to air-brake mechanism for trains and other vehicles, my object being to provide a simplified form of mechanism whereby the brakes may be effectively set and unset, and, moreover, to provide an automatic system in which the triple valve may be dispensed with.

My invention further contemplates an improved form of valve whereby air may be admitted from one chamber to another at full pressure or at any desired pressure less than full pressure.

In accordance with my invention I provide the usual air-reservoir and train-pipe connected therewith, which latter extends throughout the train, and I provide an auxiliary reservoir associated with the brake-cylinder, so that one side of the piston of the brake-cylinder is subjected to the pressure of the auxiliary reservoir, while the other side is subjected to the pressure of the train-pipe. By reducing the pressure in the train-pipe by the usual trainman's valve the pressure in the auxiliary cylinder becomes dominant and actuates the brake. The increase again of the pressure in the train-pipe results in throwing off the brake. For effecting a sudden release of the air when the brakes are thrown on I provide improved forms of self-operating valves, as will hereinafter be more particularly described. By subjecting one side of the brake-piston to air which is independent of the train-pipe and the other side to the train-pipe I am enabled to have at all times a pressure sufficient to set the brakes, which is independent of the pressure in the train-pipe. The air supplied to the auxiliary reservoir is sufficient to operate the brakes a number of times successively, and by lowering the pressure in the train-pipe this independent body of air acts to set the brakes, while the return of the train-pipe pressure to the normal serves to return the piston and unset the brakes. When the auxiliary reservoir is connected through a triple valve, as heretofore, the brake-cylinder is connected with the atmosphere at each release, so that a cylinder full of air taken from the auxiliary cylinder is exhausted at each release. This necessitates the frequent replenishing of the air in the auxiliary reservoir. In the structure of my invention the air in the auxiliary reservoir is not exhausted and needs replenishing at long intervals only to allow for leakage.

Instead of the usual operating or engineer's valve I preferably employ in the above system a graduating reducing-valve arranged to supply air to the train-pipe at full pressure or at any desired pressure less than full pressure to release the air rapidly or slowly at will. This valve in its individual capacity constitutes one of the features of the present invention, and while the air-brake system above mentioned may be employed in connection with any of the usual forms of engineer's valves I preferably employ this particular form on account of its greater utility. The valve is provided with mechanism whereby by moving the handle or operating element thereof to any desired position the pressure of the air supplied from a primary receiver to a secondary receiver may be predetermined. In straight air systems the valve, as usually heretofore employed, has been opened to a greater or less extent and held open for a longer or shorter period, according to the length of the train-pipe and the pressure desired. It is usually necessary to provide in connection with the valve a gage in convenient position to be watched by the operator, whereby he can determine when the pressure has risen to the desired extent. When the pressure has reached the desired point, the operator must close the valve by hand.

With the valve of my invention the valve may be opened to a particular point corresponding to the pressure desired and may be left in this position, and when the pressure rises to the required amount the valve will automatically close without further attention from the operator. The position to which the valve should be moved may be indicated by a suitable scale, or preferably is left to the knowledge of the operator, who will know how far the handle should be moved to secure any particular pressure both in applying and in releasing the brakes. For straight air systems, therefore, my valve is an improvement over others now commonly in use, since it does away with the necessity of the operator's estimating the distance to which the valve should be opened and the time during which the same should be left open, and, furthermore, obviates the necessity of continually watching the gage to determine when the proper pressure has been reached.

With automatic systems it has been found necessary to provide a complicated engineer's valve to effect a gradual release of the air. By the employment of the valve of my invention this complicated engineer's valve may be dispensed with and a gradual release of the air can be secured by moving the handle a short distance until the valve has closed, or is about to close automatically, after which the handle may be moved a short distance farther, the handle being thus moved step by step to permit a gradual release of the air. While this valve is particularly applicable to air-brake systems generally, it is equally applicable in any place where it is desired to supply air from one chamber or reservoir, which I term a "primary" receiver, to another chamber or reservoir, which I term a "secondary" receiver. By the employment of the valve of my invention air may be supplied to the secondary receiver at any prearranged pressure. The valve in the usual form comprises a stationary part or base having two or more ports therein, one leading to the primary receiver and another leading to the secondary receiver, and such other ports as may be desired, and a moving part adapted to be operated by a suitable handle which is provided with a pair of ports adapted to coact with the ports of the stationary portion, and these ports in the movable part of the valve lead to a cylinder, within which moves a piston, which in one position serves to isolate the ports and in another position to unite the same. The piston is normally maintained in position to isolate the ports by means of a spring, the tension of which may be graduated by the movement of the operating-handle. By thus moving the operating-handle to any particular position the tension of the spring is predetermined, and the pressure from the primary receiver serves to move the piston into position to afford communication between the ports, and the piston remains in this position until the pressure in the secondary receiver rises to such a value that, in connection with the tension of the spring, it serves to overcome the pressure in the primary receiver, thereby moving the piston into position to isolate the ports. The valve may thus be opened to any desired extent and left in this position, and when the pressure in the secondary receiver rises to the value predetermined by its position the valve will be automatically closed.

When it is desired to control the pressure supplied from a primary receiver to a single secondary receiver, the valve may partake of a simpler form, a suitable port or passage being provided for the passage of the fluid and a movable element provided for normally sealing the port and yieldingly held in position by a spring or equivalent device, the tension of which may be adjusted at will by means of a suitable handle or operating device, the pressure supplied to the secondary receiver depending upon the distance through which the handle is moved, and consequently upon the tension to which the spring is adjusted.

I have illustrated my invention in the accompanying drawings, in which—

Figure 1 is a view illustrating the air-brake mechanism of my invention. Fig. 2 is a detached view of the air-brake cylinder. Fig. 3 is a sectional view thereof on line 3 3, Fig. 2. Fig. 4 is a view of a modification. Fig. 5 is a sectional view of a form of quick-opening exhaust-valve. Fig. 6 is a plan view, partially in section, of the graduating reducing-valve of my invention. Fig. 7 is a sectional view thereof on line 8 8, Fig. 6. Fig. 8 is a sectional view thereof on line 9 9, Fig. 6.

I have illustrated the usual reservoir $a$ connected through a manual or engineer's valve $b$ with the train-pipe $c$, which is arranged to extend throughout the train. The valve $b$ in one position is adapted to connect the train-pipe with the reservoir and in the other position to connect the train-pipe with the exhaust-pipe $c'$. The auxiliary reservoir $d$ is connected with the train-pipe through a check-valve $d'$, which permits air to flow toward the auxiliary reservoir, but prevents any backward flow of the air. One end of the brake-cylinder $e$ is connected with the air-reservoir $d$, while the other end is connected by pipe $e'$ with the train-pipe $c$. Within the cylinder $e$ is a piston $f$, having a spring $f'$, imparting to the same a tendency to move to the left. The brake-shoes are connected with the end of the piston-rod $f^2$ in any approved manner. When the train-pipe is connected with the reservoir $a$, air is admitted to the auxiliary reservoir $d$ and also to the brake-cylinder on both sides of the piston thereof. When the train-pipe is connected with the atmosphere, the pressure upon the right-hand side of the brake-piston is lowered, while the pressure upon the opposite side remains practically unchanged, and, due to the difference of pressure, the piston is moved to the right to set the brakes. When the pressure in the train-pipe is returned to the normal by connecting the same with the reservoir $a$, the pressure in the right-hand side of the brake-piston is increased, and the piston is moved back to the original position, thereby unsetting the brakes.

As illustrated in Fig. 1, the exhaust must take place through the pipe $c'$, and therefore the air in the exhaust must pass throughout the length of the train-pipe.

In order to effect the rapid exhaust of the air and the quick setting of the brakes, I may employ an exhaust-valve $e^2$. (Illustrated in detail in Fig. 5.) One end of this valve—that is, the right-hand end, as illustrated in Fig. 5—is connected with the train-pipe, while the opposite end is connected with the brake-cylinder. The air is allowed a continuous passage from the train-pipe to the brake-cylinder through the ports $e^3$ $e^3$ and through the port $e^4$ in the piston $e^5$. The piston is maintained to the left by means of a coiled spring $e^6$ and normally seals an exhaust-port $e^7$. When the pressure in the train-pipe is lowered, the pressure from the brake-cylinder overcomes the tension of the spring $e^6$ and depresses the piston $e^5$, thereby opening the exhaust-port $e^7$ and permitting the air to escape from the brake-cylinder directly into the atmosphere. A sudden release of the air is thus effected and the brakes are set suddenly.

Instead of employing a check-valve $d'$, as illustrated in Fig. 1, the valve $d'$ may be a hand-valve, which may be opened to supply air to the auxiliary reservoir and then closed, the entrapped air in the auxiliary reservoir serving to move the piston to set the brakes whenever the pressure on the other side of the piston is decreased by lowering the pressure in the train-pipe. The hand-valve $d'$ may be opened at intervals to replenish the air in the auxiliary reservoir.

In Fig. 4 I have illustrated a modification in which the auxiliary reservoir and the brake-cylinder are combined, the piston $f^3$ of the brake-cylinder being provided with a check-valve $e^{14}$, which prevents air entering the cylinder by the pipe $e^8$, connected with the train-pipe to pass into the reservoir $d^2$ while preventing the backward flow of the air. Air is thus entrapped in the reservoir $d^2$, which serves when the pressure in the train-pipe is lowered to move the piston to the right and set the brakes. The increase of the pressure in the train-pipe to the normal serves to return the piston to its original position, thereby unsetting the brakes.

The graduating reducing-valve of my invention consists of a casing of any preferred form, in the present instance shown as possessing a main body portion or base $h$ and a cover $h'$, suitably secured thereto. The base of the casing is shown in the present instance as provided with three ports $h^2$, $h^3$, and $h^4$. The valve as thus designed is adapted for employment in an air-brake system such as that above described, the port $h^2$ being connected with the reservoir, while the port $h^3$ is connected with the train-pipe and the port $h^4$ with the exhaust or atmosphere. Mounted in the casing is the moving or rocking part $k$, provided with an upwardly-extending spindle $k'$, upon which is mounted a suitable handle $k^2$, whereby the part $k$ may be rocked to any desired position. The part $k$ carries two ports $b^7$ and $b^8$, the ports at the lower ends being circular in form and arranged to coact with the ports in the base $h$ in the several positions of the part $k$. A transverse bore $k^3$ is provided in the part $k$, within which moves a piston $b$, secured to a sleeve $b'$, which passes through a suitable stuffing-box and carries a plunger $b^2$, between which and the piston a coiled spring $b^3$ is placed. The plunger $b^2$ carries upon the end a roller $b^4$, adapted to engage and ride upon a track or guide $b^5$. The piston $b$ normally rests against a shoulder $b^6$, and the port or passage $b^7$ communicates with the left-hand face of the piston, as shown in the drawings, which port at its lower end is of circular form to correspond with the shape of the ports $h^2$ $h^3$. The port $b^8$ communicates with the right-hand face of the piston, the lower end thereof being circular in form to coact with the ports $h^3$ and $h^4$. When the handle $k^2$ is moved to change the angular position of the part $k$, carrying the cylinder and piston, the ports $b^7$ and $b^8$ in the part $k$ are moved into position to coact with the ports in the base. Thus if the handle $k^2$ be moved in contraclockwise direction the port $b^7$ communicates with the port $h^2$ and the port $b^8$ communicates with the port $h^3$. Air from the reservoir is thus admitted through ports $h^2$ and $b^7$ to the left-hand face of the piston, while the right-hand face of the piston is in communication with the train-pipe through the ports $b^8$ and $h^3$. The tension of the spring $b^3$ is so adjusted that in the "off" position shown in Fig. 6 the tension of the spring nearly equals the normal pressure within the main reservoir, and as the valve is moved in the contraclockwise direction from the central position the spring presses the plunger $b^2$ outward, as limited by the engagement of the roller $b^4$ and track $b^5$, and the spring $b^3$ is elongated, thereby diminishing its tension. Accordingly in any position on this side of the off position the pressure in the main reservoir exceeds the tension of the spring $b^3$, and consequently the piston $b$ is moved to the right against the tension of said spring, thereby affording a communication between the ports $b^7$ and $b^8$. Thus in any but the off position of the valve the piston $b$ is moved to the right, due to the pressure in the port $b^7$, thereby admitting air from the main reservoir to the train-pipe. As soon as the pressure of the air thus admitted to the port $b^8$ plus the tension of spring $b^3$ equals or exceeds the pressure in the port $b^7$ the piston $b$ is returned to the left against the shoulder $b^6$, thereby closing the passage between the ports $b^7$ and $b^8$. If it be desired to subject the train-pipe to a greater pressure, the handle $k^2$ may be moved farther from the off position in the contraclockwise direction, and if it be desired to subject the train-pipe to the full pressure of the reservoir the handle is moved to carry the plunger $b^2$ to its extreme position, in which position the tension of the spring $b^3$ is reduced to zero, and consequently the piston $b$ remains open to its full extent, due to the pressure of the main reservoir. If it be desired to close the valve, the handle is moved to the off position, thereby carrying the plunger to the position shown in Fig. 6 and sealing the communication between the ports $b^7$ and $b^8$. The connection of the main reservoir and the train-pipe serves to charge the auxiliary cylinder and release the brakes. When it is desired to set the brakes, the train-pipe is to be connected with the atmosphere to thereby lower the pressure therein, and for this purpose the operating-handle is moved from the off position in a clockwise direction, as seen in Fig. 6, thereby connecting port $b^7$ with port $h^3$, which extends to the train-pipe, and connecting port $b^8$ with port $h^4$, which extends to the atmosphere. The dominating pressure in the train-pipe acting against the left-hand face of the piston $b$ moves said piston to the right against the tension of the spring $b^3$, thereby affording a communication between the ports $b^7$ and $b^8$ and permitting the air in the train-pipe to exhaust into the atmosphere.

The sleeve $b'$ carries a collar $b^9$, adapted in the extreme positions of the valve to engage the lugs $b^{10}$ $b^{10}$, the angular positions of which serve to force the collar $b^9$ outward, thereby forcing the piston to move to the right and positively opening the communication between the ports $b^7$ and $b^8$. The provision of the coacting collar and lugs is advisable, since any tendency of the plunger to stick within the sleeve $b'$ may thus be overcome.

By the employment of the valve as above described any desired pressure in the train-pipe, which may be called the "secondary" receiver, can be secured. If full pressure is desired in the secondary receiver, the handle is moved to carry the plunger $b^2$ to its extreme outward position, in which case the tension of the spring $b^3$ is zero, and the piston is thereby permitted to be opened to its full extent to subject the secondary receiver to the full pressure in the main reservoir or primary receiver. If it be desired to subject the secondary receiver to an intermediate pressure less than full pressure, the handle is moved to carry the plunger to a corresponding intermediate position, where the tension of the spring is reduced to permit the piston to remain in the open position until the required pressure has been attained in the secondary receiver. When this pressure, added to the pressure of the spring, equals or exceeds the pressure in the primary receiver, the communication between the two receivers will be automatically closed. The valve may thus be opened to the desired degree and left in the opened position, and the valve will automatically close when the pressure in the secondary receiver reaches the prearranged value.

It is frequently desired in the operation of straight air-brakes to set the brakes with less pressure than full pressure of the reservoir. Thus if the main-reservoir pressure be fifty pounds it is frequently desirable to set the brakes with, say, twenty pounds pressure. In order to accomplish this with the valve of my invention, the handle is moved until the plunger has been carried to the position corresponding to twenty pounds pressure, and the piston $b$ will be moved to the right and remain so until the twenty pounds pressure has been reached in the train-pipe, when the said pressure and the tension of the spring will exceed the pressure of the main reservoir, and the piston $b$ will thus be moved to the left to cut off the train-pipe from the main reservoir. In releasing the brakes the handle will be moved to carry the plunger to the central or off position, and the movement will be continued beyond this central position until the plunger is carried to such a position that the twenty pounds pressure in the train-pipe will be sufficient to overcome the tension of the spring and move the valve $b$ to connect the ports $b^7$ and $b^8$, thereby completing the communication between the train-pipe and the atmosphere. It will be observed that in the employment of the valve to release the brakes the brakes will remain set until the handle has been moved to carry the plunger to a position where the tension of the spring will be less than the pressure in the train-pipe. Usually in throwing off the brakes the handle will be moved by easy stages to the extreme position, thereby gradually removing the tension of the spring and permitting the piston to open successively, thereby permitting a gradual exhaust and smooth stop.

While I have illustrated the valve of my invention as designed for employment with an automatic air-brake system—that is, with three ports $h^2$ $h^3$ $h^4$ in the base for connecting with the receiver, the train-pipe, and the atmosphere, respectively—the valve may be employed in other connections and may be employed with, for instance, two ports $h^2$ $h^3$ when it is desired to admit air from a primary receiver to a secondary receiver at a graduated pressure. While, therefore, I have disclosed my invention in connection with a specific form of valve particularly designed for air-brake systems, it will be understood that the valve is equally applicable to other uses and that the simplest form of valve is one in which there are but two ports in the base or stationary portion of the valve, one to be connected with a primary receiver and the other with a secondary receiver, whereby air may be admitted to the secondary receiver at any desired pressure.

Having described my invention, what I claim as new, and desire to secure by Letters Patent, is—

1. The combination with a main reservoir, a train-pipe, and an exhaust, of a controlling-valve having a passage connected with each of said above-mentioned elements and a movable part having two ports adapted to connect together the passages connected with the main reservoir and the train-pipe or to connect together the passages connected with the train-pipe and the exhaust and a movable element normally isolating the ports of said movable part and adjustable means, as a spring, for varying the pressure required to move the said movable part into position to connect the ports, substantially as described.

2. A valve having a stationary portion provided with an inlet and an outlet port, and having a movable portion carrying a pair of ports to coact therewith, a piston or other movable element normally isolating the ports in said movable portion of the valve, a spring for yieldingly holding said piston in the closed position, a plunger for regulating the tension of said spring, a guide or track for determining the position of said plunger, and suitable means for moving said plunger along said track or guide, substantially as described.

3. The combination, with the stationary portion of a valve having an inlet and an outlet port, of the movable portion of a valve provided with a bore or cylinder, a piston therein, ports extending from said cylinder on opposite sides of the normal position of said piston, and adapted to coact with the ports in the stationary portion of the valve, a spring for yieldingly holding said piston in its normal or closed position, a plunger for regulating the tension of said spring, a guide or track over which said plunger is adapted to ride to regulate the position thereof, and a suitable handle or operating means for moving the movable portion of said valve to carry the plunger along said track or guide, and thereby regulate the tension of said spring, substantially as described.

4. A graduating reducing-valve consisting of a stationary portion provided with three ports, a movable part having a pair of ports adapted to coact with the ports of the stationary portion of the valve to connect the same in pairs, a movable element for normally isolating the ports in the movable portion of said valve, and means for adjusting at will the pressure required to move said movable element into position to connect the ports in the movable portion of the valve, substantially as described.

5. In an air-brake system, the combination with an air reservoir or supply, of a train-pipe, suitable braking mechanism associated therewith, and a graduating reducing-valve, having a portion provided with three ports, one connected with said reservoir, another with the train-pipe, and a third with the exhaust, and having another portion movable relatively thereto provided with a pair of ports to coact with two of said three ports according to the position of the movable portion and carrying a movable element normally isolating the members of said pair of ports, and having means for adjusting at will the pressure required to move said movable element into position to connect the ports, substantially as described.

In witness whereof I have hereunto subscribed my name in the presence of two witnesses.

REUBEN B. BENJAMIN.

Witnesses:
W. CLYDE JONES,
M. R. ROCHFORD.